United States Patent [19]

Birchmeier

[11] Patent Number: 5,657,664
[45] Date of Patent: Aug. 19, 1997

[54] TRANSMISSION FOR AN ACTUATING DRIVE HAVING A SPRING RETURN FEATURE

[75] Inventor: Werner Birchmeier, Jona/Schweiz, Germany

[73] Assignee: Johnson Service Company, Milwaukee, Wis.

[21] Appl. No.: 508,486

[22] Filed: Jul. 28, 1995

[30] Foreign Application Priority Data

Aug. 17, 1994 [EP] European Pat. Off. ............. 94112826

[51] Int. Cl.$^6$ ................. F16H 19/08; F03G 1/00
[52] U.S. Cl. ......................... 74/89.19; 185/40 R
[58] Field of Search .................. 74/89.18, 89.19; 185/40 R; 251/69

[56] References Cited

U.S. PATENT DOCUMENTS

| | | | |
|---|---|---|---|
| 2,281,383 | 4/1942 | Raphael | 74/89.19 |
| 2,502,356 | 3/1950 | Wagner | 74/377 |
| 3,042,357 | 7/1962 | Engholdt | 74/89.19 X |

FOREIGN PATENT DOCUMENTS 2 133 237  1/1973  Germany.

*Primary Examiner*—Allan D. Herrmann
*Attorney, Agent, or Firm*—Harness, Dickey & Pierce, P.L.C.

[57] ABSTRACT

A transmission for an actuating drive having a spring return feature includes a drive pinion (2) associated with the actuating drive; an intermediate pinion (5) meshing with the drive pinion (2); an output shaft (3) having a clutch (4 for a final control element, and two gears (6, 7) rotatably mounted within the transmission housing (1). Each gear (6, 7) has an external toothing (8, 9) and a rotatably mounted hub (10, 11) so extending around the output shaft (3) as to leave an annular gap between the same and the hub. The drive gear (2) meshes with the external toothing (8) of one of the two gears. The intermediate pinion (5) meshes with the external toothing (9) of the other gear. A coupling sleeve (14) is disposed in the annular gap between the output shaft (3) and the gears (6, 7), is releasably connected to the output shaft (3) and is coupled positively with the hub (10, 11) of one of the gears. The direction of rotation of the output shaft (3) is variable by changing the coupling sleeve (14).

7 Claims, 2 Drawing Sheets

TRANSMISSION FOR AN ACTUATING DRIVE HAVING A SPRING RETURN FEATURE

FIELD OF THE INVENTION

The invention relates to a transmission for an actuating drive having a spring return feature.

BACKGROUND OF THE INVENTION

Actuating drives having a spring return feature are often used to operate final control elements, more particularly valves, in heating, air-conditioning and ventilation systems. Drives of this kind, hereinafter called spring return drives, have a return spring which is tensioned by a motor having a reduction gearing. The energy stored in the return spring Is released when the electric motor becomes currentless. The spring return feature ensures that in the event of a power failure the final control element moves into a safety position, normally the closed position.

Actuating drives are in practice fitted to both the left side and right side of final control elements, for example, ventilation valves. The choice of side for assembly depends upon the space available in an existing system. However, the direction of rotation of a valve alters with a change of the assembly side For example, if a valve opens from the left as considered clockwise, it opens from the right as considered anticlockwise.

Spring return actuating drives generally have only a single return spring. The spring return movement and the direction of rotation of the actuating drive output shaft associated with the final control element are fixed. In the prior art a specific direction of assembly is always associated with the actuating drive.

It is known to turn the output shaft for connection to the final control element through 180° for adaptation to the direction of valve rotation. However, this leads to the disadvantage in virtually all cases that, after the output shaft has been turned, control and connection members, for example, auxiliary switches, hand tensioning, connection terminals, circuit boards or the like are accessible only with difficulty, if at all.

A problem which the invention intends to solve is to provide a transmission for a spring return actuating drive which enables the output shaft associated with the final control element to reverse its direction of rotation.

The subject of the invention and the solution of the problem is a transmission for an actuating drive having a spring return feature, the transmission having:

a drive pinion associated with the actuating drive;

an intermediate pinion meshing with the drive pinion;

an output shaft having a clutch for a final control element, and two gears which are disposed axially and consecutively on the same spindle, each gear having external toothing and a rotatably mounted hub so extending around the output shaft as to leave an annular gap between the same and the hub, wherein the drive pinion meshes with the external toothing of one of the two gears and the intermediate pinion meshes with the external toothing of the other gear and a coupling sleeve is disposed in the annular gap between the output shaft and the gears, is releasably connected to the output shaft and is coupled positively with the hub of one of gears.

The intermediate pinion driven by the drive pinion rotates in the opposite direction thereto consequently, the transmission according to the invention has two gears which rotate synchronously in time with the drive pinion but in different directions. The coupling sleeve is interchangeable and represents, as it were, a switching element which selectively transmits the movement of one or other gear to the output shaft associated with the final control element. The coupling sleeve does not need its own mounting on the housing side and is therefore readily interchangeable.

Various constructional solutions present themselves for the further development of the transmission according to the invention. In a preferred construction of the transmission according to the invention, the hubs of the gears each have internal toothing engageable with a toothed ring on the periphery of the coupling sleeve. This construction ensures a uniform transmission of the torque. In a further development of the invention, the coupling sleeve has a plain cylindrical part into which the toothed ring merges and which is rotatable relatively to the hub of the gears. Conveniently, the hubs of the two gears driven by the drive pinion or intermediate pinion are identical, i.e., they have the same dimensions and the same toothing. The coupling sleeve extends through the annular gap defined by the two hubs, one half of the coupling sleeve having a toothed ring corresponding to the internal toothing of the hubs while the other half is plain cylindrical. The coupling sleeve is introducible at choice into the annular gap between the hubs and the output shaft on either the end face facing the actuating drive or on the end face remote therefrom. In a preferred embodiment, a catch spring secured to the output shaft is provided to secure the coupling sleeve.

The actuation distance of the spring return drive is usually so limited that the output shaft makes angular movements of at most 180°, the rotation being either clockwise or anticlockwise depending upon how the coupling sleeve is fitted. The gears consist of the hub and a circle segment disc on whose periphery the external toothing is disposed. The alignment of the circle segment disc and the length of the arc segment are adapted to the actuation travel of the spring return drive and to the direction of output shaft rotation.

The invention will be described hereinafter with reference to a drawing which illustrates just one embodiment and in which in diagrammatic form:

DETAILED DESCRIPTION OF THE PREFERRED EMBODIMENTS

Figure 1:
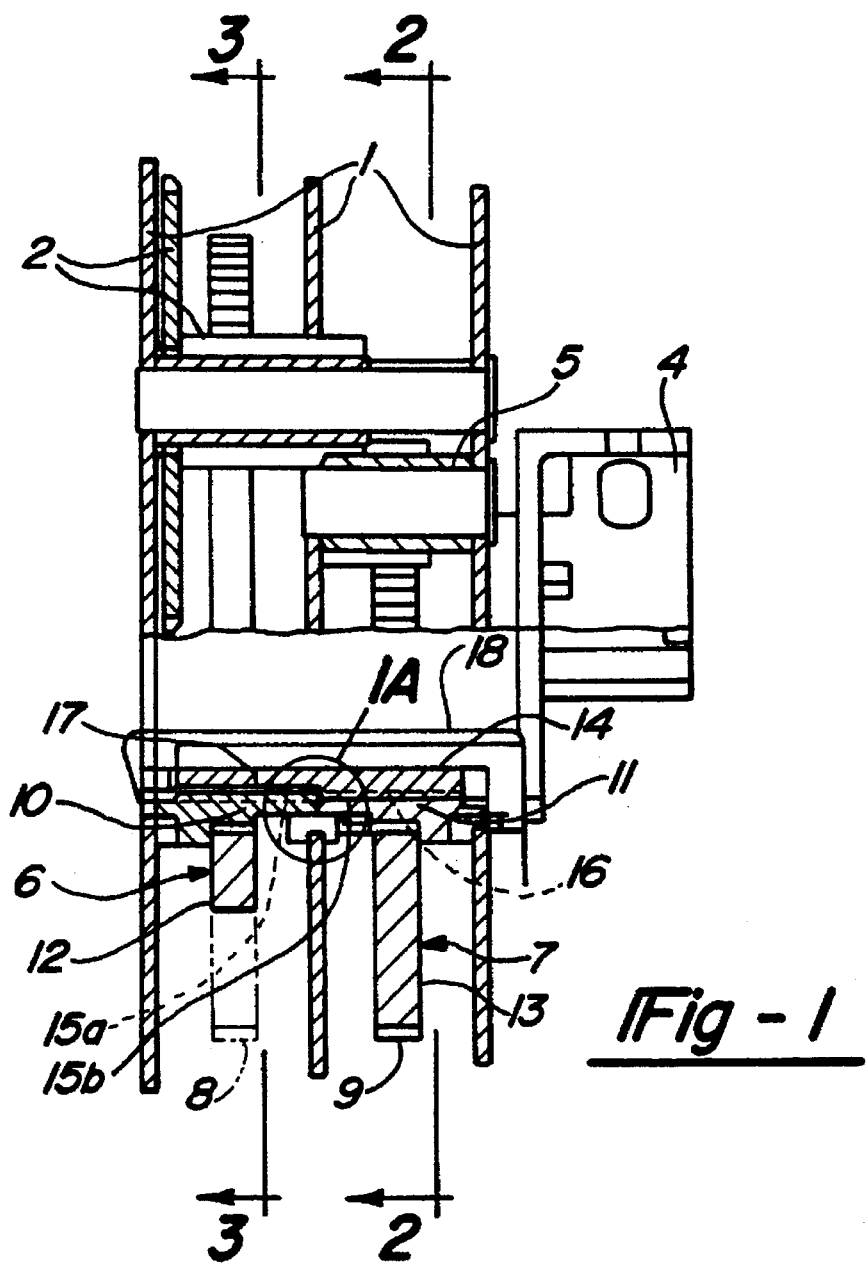
FIG. 1 is a longitudinal section through the transmission according to the invention.
Figure 1A:
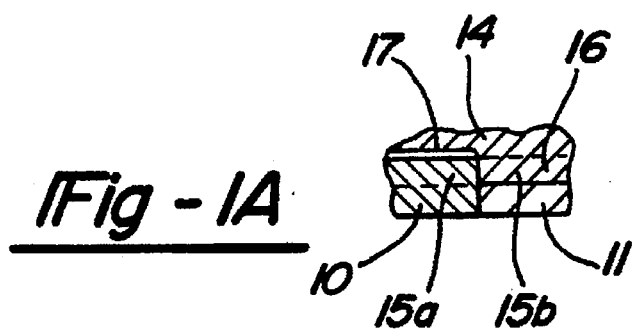
FIG. 1A is an enlarged partial sectional view of the area within circle "A" of FIG. 1.

The transmission illustrated is intended for an actuating drive having a spring return feature and hereinafter called a spring return drive. The basic construction of the transmission comprises a housing 1 connectable to the spring return drive, a drive pinion associated therewith and an output shaft 3 (best seen in FIGS. 2 and 3) having a clutch 4 for a final control element (not shown). The same can be a valve in a heating or air-conditioning or ventilation system.

The transmission also has an intermediate pinion 5 meshing with the drive pinion 2 and two gears 6, 7 disposed on the same spindle. The gears 6, 7 have external toothing 8, 9 and each has a hub 10 11 which extends around the output shaft 3 to leave an annular gap between the same and the respective hub. Like the drive pinion 2, intermediate pinion 5 and output shaft 3 the gears 6, 7 are rotatably mounted in the housing 1.

Figure 2:
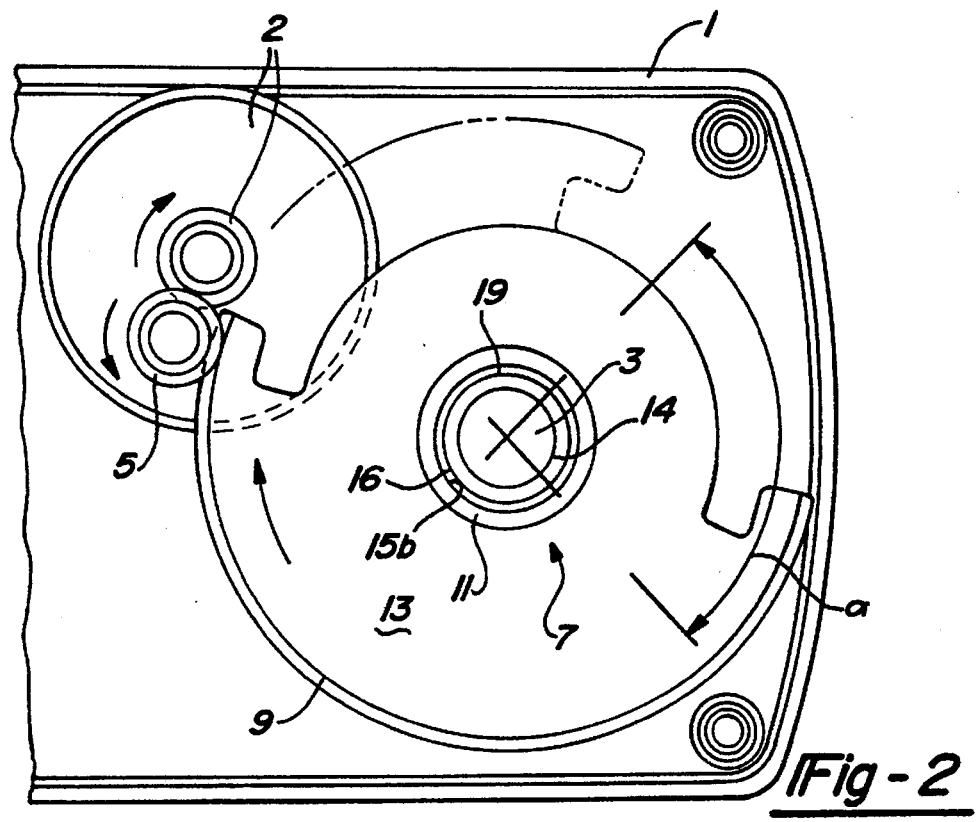
FIG. 2 is a section on the line 2—2 of FIG. 1.
Figure 3:
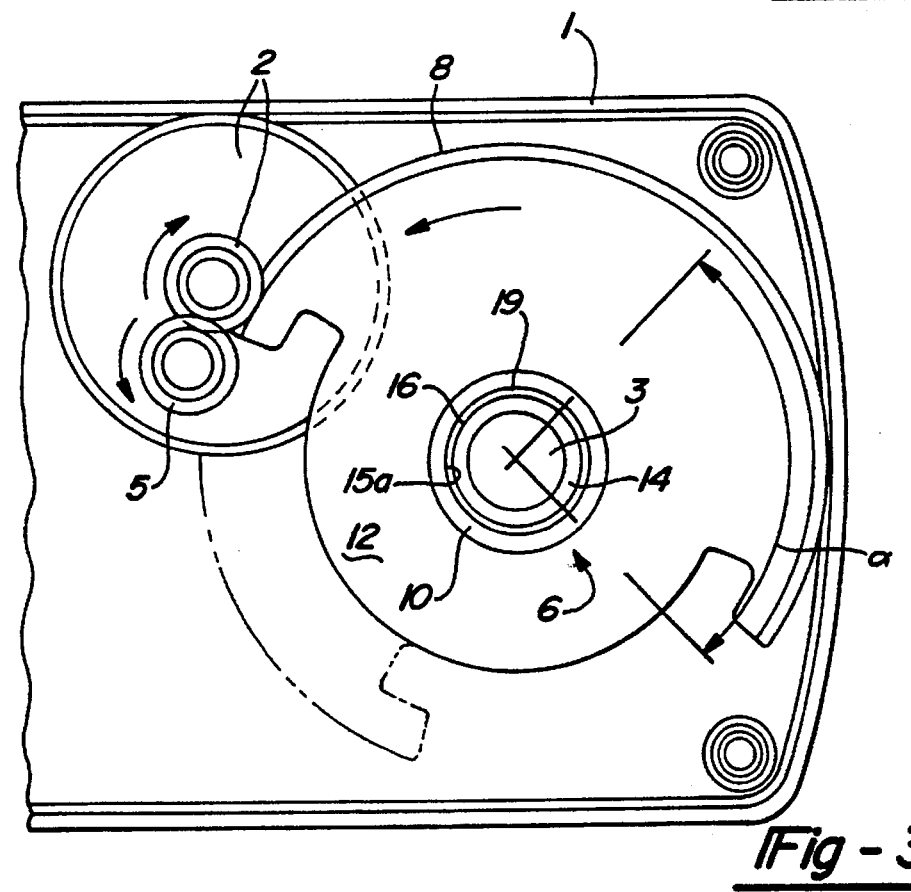
FIG. 3 is a section on the line 3—3 of FIG. 1.

FIGS. 2 and 3 are each a plan view of the gears 6, 7 and show the kinematics of the arrangement. The gears 6, 7 consist of the hub 10, 11 and a circle segment disc 12, 13 on whose periphery the external toothing 8, 9 is disposed. Drive pinion 2 meshes with external toothing 8 of one gear 6 while intermediate pinion 5 engages the external toothing 9 of the other gear 7. Since the intermediate pinion 5 is driven by the drive pinion 2 it rotates to the opposite hand as compared therewith. The wheels 6, 7 move synchronously but in opposite directions. The movement patterns are represented in FIGS. 2 and 3 by arrows. When the drive pinion 2 rotates clockwise the gears 6, 7 rotate in the manner shown into the operative positions shown in chain-dotted lines. The adjustment angle a traversed is 93° in the exemplified embodiment.

As can be gathered from FIG. 1 and most clearly seen in FIGS. 2 and 3, a coupling sleeve 14 is disposed in the annular gap 19 between the output shaft 3 and the gears 6, 7, is releasably connected to the shaft 3 and coupled positively with the hub of one of the gears, in this case the hub 11 of the gear 7. As is well known in the art, catch spring 18 is provided and is suitably secured to output shaft 3. Catch spring 18 engages coupling sleeve 14 for retaining coupling sleeve 14 within annular gap 19. The coaxially mounted gears 6, 7 have on the hub side internal toothing 15 engageable with a toothed ring 16 on the periphery of the sleeve 14. Because of the resulting positive connection the torque is transmitted by way of the sleeve 14 to the output shaft 3. The sleeve 14 also has a plain cylindrical part 17 into which the toothed ring 16 merges and which is rotatable relatively to the hub of the gears, in this case to the hub 10 of the gear 6. If as shown in the exemplified embodiment the direction of rotation of the output shaft 3 is to correspond to the direction of rotation of the gear 7, the half-toothed sleeve 14 is introduced into the annular gap from that end face of the housing 1 which faces the clutch 4, the sleeve 14 then being secured in the position shown by a catch spring 18 secured to the output shaft 3. The toothed ring 16 and the internal toothing 15 on the hub 11 of the gear 7 produce a positive connection which transmits the torque from the gear 7 to the output shaft 3. The contradirectionally driven gear 6 runs freely on the plain cylindrical part 17 of the sleeve 14. If the output shaft 3 is required to rotate in the same direction as the gear 6, the sleeve 14 is removed and introduced into the annular gap from the housing end face remote from the clutch 4. In this case the power is transmitted from the other gear 6 through the sleeve 14 to the output shaft 3.

I claim:

1. A transmission for an actuating drive having a spring return feature, the transmission having:

a drive pinion (2) associated with the actuating drive;

an intermediate pinion (5) meshing with the drive pinion (2);

an output shaft (3) having a clutch (4) for a final control element, and two gears (6, 7) having external toothing (8, 9) and a hub (10, 11) rotatably mounted about the output shaft and so extending around the output shaft (3) as to leave an annular gap between the same and the hub, wherein the drive pinion (2) meshes with the external toothing (8) of one of the two gears and the intermediate pinion (5) meshes with the external toothing (9) of the other gear and a coupling sleeve (14) is disposed in the annular gap between the output shaft (3) and the gears (6, 7), the coupling sleeve (14) coupling the output shaft (3) and the hub (10, 11) of one of the gears (6 or 7).

2. A transmission according to claim 1 wherein the hubs (10, 11) of the gears (6, 7) each have internal toothing (15) engageable with a toothed ring (16) on the periphery of the coupling sleeve (14).

3. A transmission according to claim 2 wherein the coupling sleeve (14) has a plain cylindrical part (17) into which the toothed ring (16) merges and which is rotatable relatively to the hub (10, 11) of the other of the gears (6, 7).

4. A transmission according to claim 3 wherein the coupling sleeve (14) is secured axially by means of a catch spring (18) secured to the output shaft (3).

5. A transmission according to claim 4 wherein the gears (6, 7) consist of the hub (10,11) and a circle segment disc (12,13) on whose periphery the external toothing (8, 9) is disposed.

6. A transmission according to claim 1 wherein the coupling sleeve (14) is secured axially by means of a catch spring (18) secured to the output shaft(3).

7. A transmission according to claim 1 wherein the gears (6, 7) consist of the hub (10,11) and a circle segment disc (12, 13) on whose periphery the external toothing (8, 9) is disposed.

* * * * *